US009168897B2

(12) United States Patent
Erdal

(10) Patent No.: US 9,168,897 B2
(45) Date of Patent: Oct. 27, 2015

(54) WINDSCREEN WIPER DEVICE

(71) Applicant: Federal-Mogul S.A., Aubange (BE)

(72) Inventor: Avsar Erdal, Aubange (BE)

(73) Assignee: Federal-Mogul S.A., Aubange (BE)

(*) Notice: Subject to any disclaimer, the term of this patent is extended or adjusted under 35 U.S.C. 154(b) by 0 days.

(21) Appl. No.: 14/275,682

(22) Filed: May 12, 2014

(65) Prior Publication Data
US 2015/0082578 A1 Mar. 26, 2015

Related U.S. Application Data

(63) Continuation of application No. 12/300,202, filed on Oct. 12, 2009, now Pat. No. 8,756,748.

(51) Int. Cl.
*B60S 1/40* (2006.01)
*B60S 1/38* (2006.01)

(52) U.S. Cl.
CPC ............. *B60S 1/4019* (2013.01); *B60S 1/3853* (2013.01); *B60S 1/381* (2013.01); *B60S 2001/4032* (2013.01); *B60S 2001/4035* (2013.01)

(58) Field of Classification Search
CPC .......... B60S 1/381; B60S 1/3849; B60S 1/40; B60S 1/3868; B60S 1/4006; B60S 1/4016; B60S 1/4019; B60S 2001/4022; B60S 1/4035; B60S 1/4009; B60S 1/4032; B60S 2001/4061
See application file for complete search history.

(56) References Cited

U.S. PATENT DOCUMENTS

| 7,055,207 | B2* | 6/2006 | Coughlin | 15/250.32 |
| 8,756,748 | B2* | 6/2014 | Erdal | 15/250.32 |
| 2006/0026786 | A1* | 2/2006 | Ku | 15/250.32 |

FOREIGN PATENT DOCUMENTS

EP  1403156 A1 * 3/2004
FR  2736025 * 1/1997

* cited by examiner

*Primary Examiner* — Gary Graham
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade of a flexible material, which wiper blade includes opposing longitudinal grooves on its longitudinal sides, in which grooves spaced-apart longitudinal strips of the carrier element are disposed, which windscreen wiper device comprises a connecting device for a oscillating arm comprising two longitudinal arm sections connected to each other by means of a curved intermediate section, wherein said oscillating arm is pivotally connected to the connecting device about a pivot axis, with the special feature that the oscillating arm is pivotally connected to the connecting device about the pivot axis, with the interposition of a joint part, wherein the joint part comprises a resilient tongue engaging in a correspondingly shaped hole provided in the oscillating arm, and wherein the joint part and the connecting device are pivotally connected to each other by mutually cooperating protrusion/hole means, the protrusion/hole means, the protrusion/hole means being located below the longitudinal center plane between the two longitudinal arm sections.

2 Claims, 9 Drawing Sheets

WINDSCREEN WIPER DEVICE

CROSS REFERENCE TO RELATED APPLICATION

This continuation application claims priority to U.S. patent application Ser. No. 12/300,202 filed on Oct. 12, 2009, and is incorporated herein by reference. The substitute specification contains no new matter.

BACKGROUND OF THE INVENTION

1. Technical Field

The present invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of the longitudinal strips are interconnected by a respective connecting piece, which windscreen wiper device comprises a connecting device for a oscillating arm comprising two longitudinal arm sections connected to each other by means of a curved intermediate section, wherein the oscillating arm is pivotally connected to the connecting device about a pivot axis.

2. Related Art

U.S. Pat. No. 4,179,767 (Robert Bosch GmbH) describes a windscreen wiper device designed as a traditional wiper device, wherein use is made of several yokes pivotally connected to each other. In this prior art windscreen wiper device the joint part comprises one resilient tongue engaging in a correspondingly shaped hole provided in the hook-shaped oscillating arm. In order to connect the wiper blade onto the oscillating arm, the resilient tongue is initially pushed in against a spring force—as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm.

SUMMARY OF THE INVENTION

The object of the invention is to provide an improved windscreen wiper device of the "flat blade type", wherein no use is made of several yokes pivotally connected to each other, but wherein the wiper blade is biassed by the carrier element, as a result of which it exhibits a specific curvature.

In order to accomplish that objective, a windscreen wiper device of the type referred to in the introduction is characterized according to the invention in that the oscillating arm is pivotally connected to the connecting device about the pivot axis, with the interposition of a joint part, wherein the joint part comprises a resilient tongue engaging in a correspondingly shaped hole provided in the oscillating arm, and wherein the joint part and the connecting device are pivotally connected to each other by mutually cooperating protrusion/hole means, the protrusion/hole means being located below the longitudinal center plane between the two longitudinal arm sections. In other words, the protrusion/hole means defining the pivot axis are situated beneath the center plane, particularly below a longitudinal arm section of the oscillating arm facing towards the windscreen to be wiped. Thus the connection between the oscillating arm and the wiper blade is as close to the windshield to be wiped as possible, so that the stress on the connection is as low as possible.

In one preferred embodiment of a windscreen wiper device in accordance with the invention the resilient tongue comprises at least one upwardly extending protrusion and at least one downwardly extending protrusion, wherein the upwardly extending protrusion is adapted to engage in a correspondingly shaped hole provided in an oscillating arm of a first type, and wherein the downwardly extending protrusion is adapted to engage in a correspondingly shaped hole provided in an oscillating arm of a second type, the oscillating arms of the first and the second types mutually differing in the distance between their respective longitudinal arm sections.

Particularly, the resilient tongue is rotatable along a hinge axis between a first position, wherein the upwardly extending protrusion is adapted to engage in the correspondingly shaped hole provided in the oscillating arm of the first type for retaining the wiper blade onto the oscillating arm of the first type, and wherein the downwardly extending protrusion is adapted to engage in the correspondingly shaped hole provided in the oscillating arm of the second type for retaining the wiper blade onto the oscillating arm of the second type, and a second position, wherein the upwardly extending protrusion is adapted to disengage from the correspondingly shaped hole provided in the oscillating arm of the first type for releasing the wiper blade from the oscillating arm of the first type, and wherein the downwardly extending protrusion is adapted to disengage from the correspondingly shaped hole provided in the oscillating arm of the second type for releasing the wiper blade from the oscillating arm of the second type.

The connecting device acts as a base part, wherein the connecting device is preferably fixedly connected to the longitudinal strips through a welding, brazing ("soldering"), gluing or clamping operation. Particularly the joint part (but preferably also the connecting device) is a universal connection part for different types of hook-shaped oscillating arms, that is oscillating arms mutually differing in the distance between their respective longitudinal arm the sections and thus in the "width" of their respective intermediate curved section. Only one type of joint part to be connected to the connecting device may be used for each different type of hook-shaped oscillating arm. The advantage achieved by the invention is that a unit consisting of the wiper blade, the connecting device connected to the longitudinal strips and the joint part connected to the connecting device can be manufactured for each and every type of hook-shaped oscillating arm. Thus, a universal connection between the wiper blade and the oscillating arm is obtained, so that car drivers are given the possibility to buy also non-original cheap wiper blades fitting the original oscillating arms on their cars.

In another preferred embodiment of a windscreen wiper device according to the invention the hinge axis is located near an inner edge of the joint part. In the alternative the hinge axis is located near an outer edge of the joint part, as described in European patent application no. 04103735.9 of the same Applicant. In the latter case the resilient tongue is forced in the outward position under the influence of a moment in case a force is exerted on the wiper blade in a direction away from the oscillating arm. Particularly, the counterforce exerted by the oscillating arm on the resilient tongue engages at a point located behind the hinge axis, seen in the direction of the force exerted on the wiper blade. In other words, the moment of force ensures in a natural way that the resilient tongue is forced automatically in its outward position, that is its position retaining the wiper blade onto the oscillating arm. On the contrary, in European patent publication no. 1 403 156 of the same Applicant the moment during use compels the resilient tongue to automatically take its inward position, thereby releasing the wiper blade from the oscillating arm, with all negative consequences involved.

In another preferred embodiment of a windscreen wiper device in accordance with the invention the upwardly extending protrusion and the downwardly extending protrusion are provided with an inclined upper surface. Sliding a longitudinal arm section of the oscillating arm of the first or the second type that faces towards the windscreen to be wiped, onto the joint part will thus not take too much force.

In another preferred embodiment of a windscreen wiper device according to the invention the joint part has an at least substantially U-shaped cross-section at the location of its connection to the connecting device, and wherein the resilient tongue extends in longitudinal direction between legs of the U-shaped cross-section.

In another preferred embodiment of a windscreen wiper device in accordance with the invention the correspondingly shaped hole is provided in a longitudinal arm section of the oscillating arm of the first and the second type that faces towards the windscreen to be wiped. The hole may have a closed circumference. Such a closed hole enhances the retention of the connection device/joint part onto the oscillating arm in all possible directions, particularly both horizontally and vertically. In the alternative, the hole has a non-closed circumference.

In another preferred embodiment of a windscreen wiper device according to the invention a cap is detachably connected to the joint part and/or the connecting device for retaining the wiper blade onto the oscillating arm. Preferably, the cap has an at least substantially U-shaped cross-section at the location of its connection to the joint part and/or the connecting device, and wherein the cap in each leg of the U-shaped cross-section is provided with a protrusion provided coaxially with the pivot axis, the protrusions extending inwards on either side of the cap and into coaxial holes of the joint part and/or the connecting device.

In another preferred embodiment of a windscreen wiper device in accordance with the invention the joint part is detachably connected to the connecting device. More in particular, the joint part is detachably connected to the connecting device through a snapping/clipping operation.

In another preferred embodiment of a windscreen wiper device according to the invention the joint part is connected to the connecting device by pivotally engaging protrusions of the connecting device, at the location of the pivot axis, in recesses provided in the joint part. It is noted that the protrusions that function as bearing surfaces are spaced far apart, so that the forces exerted thereon will be relatively low. More in particular, the joint part has an at least substantially U-shaped cross-section at the location of its connection to the connecting device, and wherein the joint part in each leg of the U-shaped cross-section is provided with a recess provided coaxially with the pivot axis. Preferably, the protrusions extend outwards on either side of the connecting device, wherein the protrusions are cylindrical. In the alternative, the protrusions are spherical or frusto-conical.

In another preferred embodiment of a windscreen wiper device in accordance with the invention the joint part is connected to the connecting device by pivotally engaging protrusions of the joint part, at the location of the pivot axis, in recesses provided in the connecting device. Preferably, the joint part has an at least substantially U-shaped cross-section at the location of its connection to the connecting device, and wherein the joint part in each leg of the U-shaped cross-section is provided with a protrusion provided coaxially with the pivot axis. More in particular, the protrusions extend inwards on either side of the joint part, and wherein the protrusions are at least substantially cylindrical. In the alternative, the protrusions are spherical or frusto-conical.

In another preferred embodiment of a windscreen wiper device according to the invention the joint part is made of plastic (including any synthetic material having some flexibility).

THE DRAWINGS

Embodiments of the invention will now be explained in more detail with reference to figures illustrated in a drawing, wherein.

DETAILED DESCRIPTION

Figure 1A:
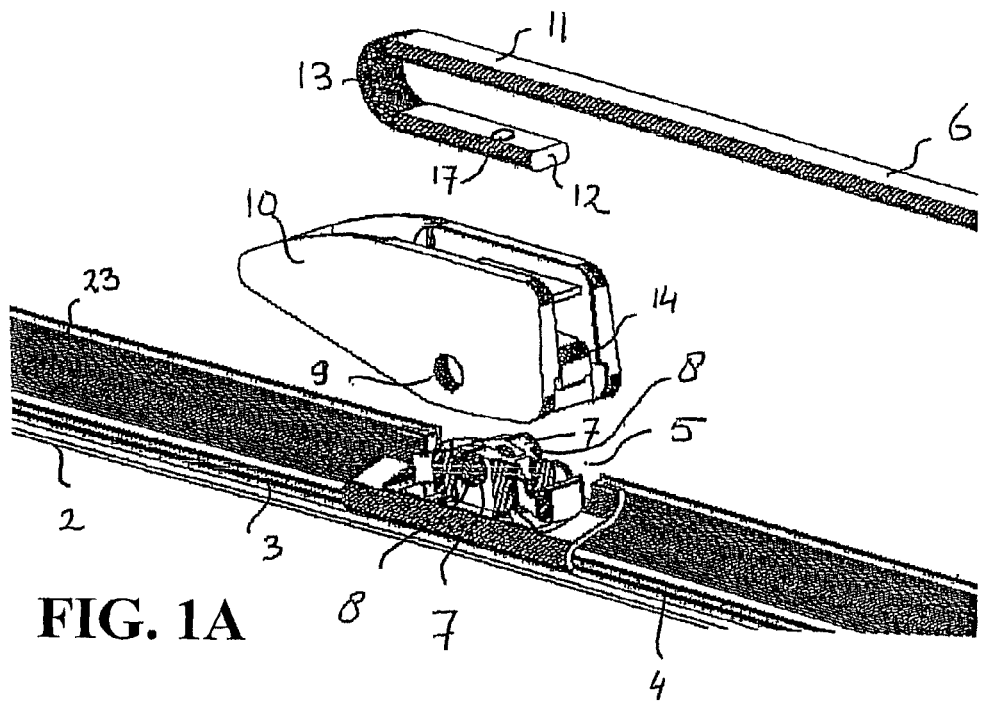
FIGS. 1A and 1B are fragmentary exploded and assembled perspective views, respectfully, according to one embodiment.
Figure 1B:
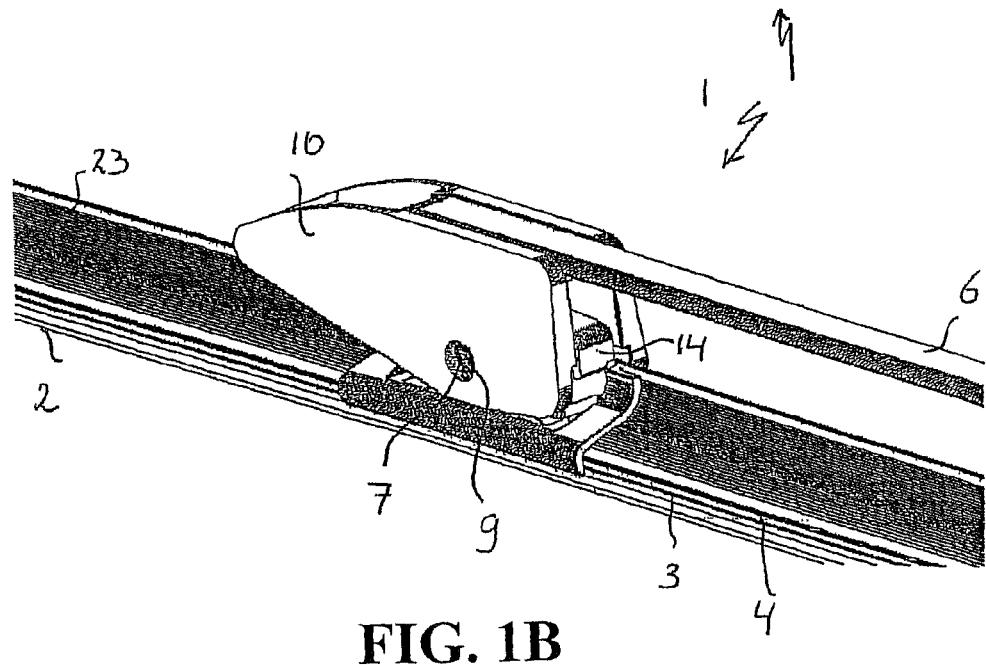

FIGS. 1A and 1B show a "flat blade type" of a windscreen wiper device 1 according to the invention. The windscreen wiper device 1 is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the wiper blade 2, as it were, which is thus biased in a curved position (the curvature in operative position being that of a windscreen to be wiped). Neighbouring ends of the strips 4 (not shown) are interconnected on either side of the windscreen wiper device 1 by means of connecting pieces —Si— functioning as clamping members (not shown). The connecting pieces could be separate constructional elements, which may be form-locked ("positive locking" or "having a positive fit") or force-locked to the ends of the strips 4. In another preferred embodiment, the connecting pieces are in one piece with the strips 4 made of spring band steel. In the latter case the connecting pieces form transverse bridges for the strips 4, as it were.

Figure 4A:
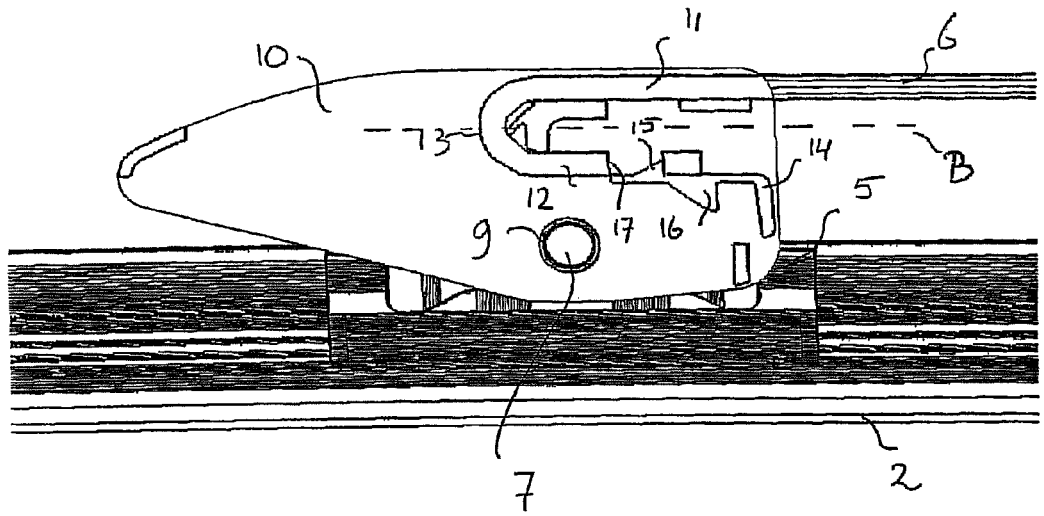
FIG. 4A, 4B are cross-sections of FIG. 3B for two different types of oscillating arms.

The windscreen wiper device 1 is furthermore built up of a connecting device 5 of plastic material for an oscillating arm 6. Alternatively, the connecting device 5 may also be made of metal, such as steel or aluminum. The connecting device 5 is particularly welded, brazed ("soldered"), glued or clamped onto the strips 4. The oscillating arm 6 is pivotally connected to the unit about a pivot axis near one end, as will be described hereunder. The connecting device 5 is a universal part in the sense that it can be used for each and every type of oscillating arm 6, that is, for example, for the oscillating arms as shown is FIG. 4.

Figure 2A:
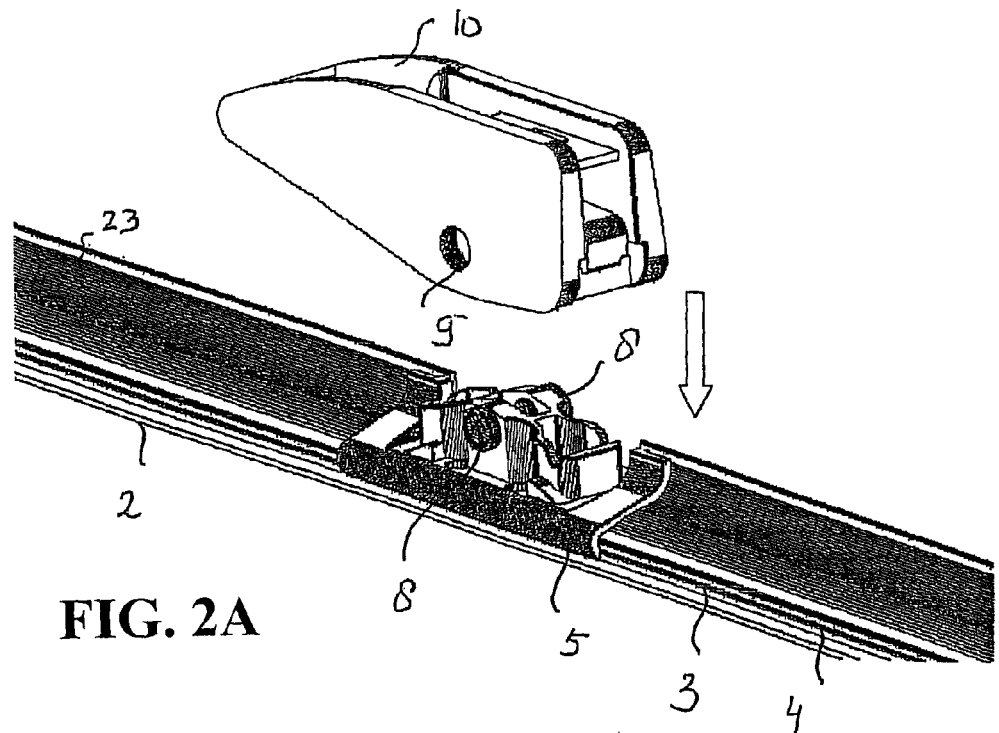
FIGS. 2A, 2B and 3A, 3B show various successive steps for fitting the connecting device, the joint part and the oscillating arm of FIG. 1B.
Figure 2B:
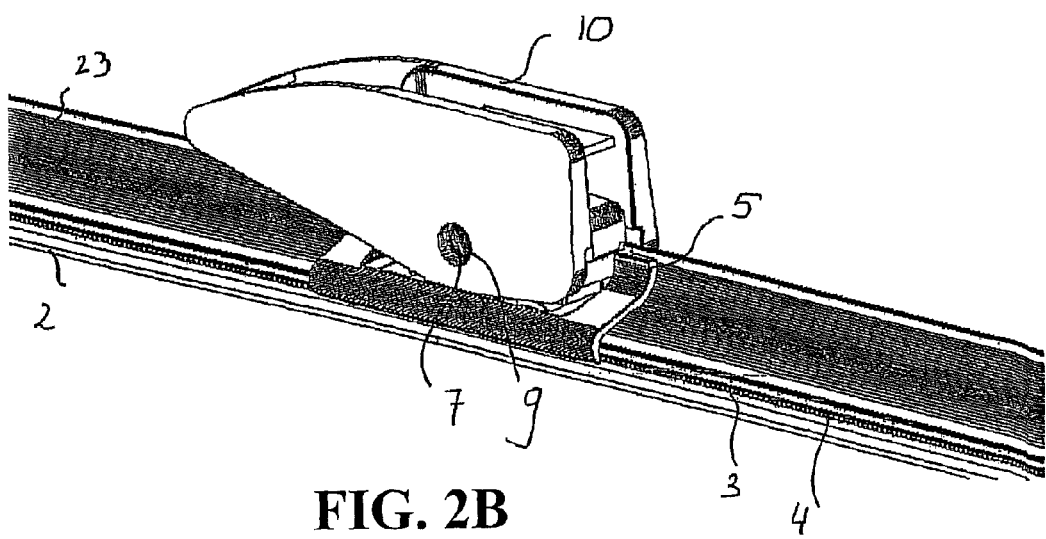

With reference to FIGS. 1A and 2A the connecting device 5 comprises two cylindrical protrusions 7 extending outwards on either side of the connecting device 5, the protrusions 7 having co-axial through holes 8. Alternatively, the protrusions 7 may have a spherical or frusto-conical shape. These protrusions 7 pivotally engage in identically shaped cylindrical recesses 9 of a plastic joint part 10 (FIGS. 1B and 2B). In the alternative the recesses 9 may have a non-closed shape (i.e. open circumference). The protrusions 7 act as bearing surfaces at the location of a pivot axis in order to pivot the joint part 10 (and the oscillating arm 6 attached thereto) about the pivot axis near one end of the oscillating arm 6. The protrusions 7 are preferably in one piece with the connecting device 5. As can be seen from FIG. 1A, the oscillating arm 6 includes two parallel longitudinal arm sections 11,12 connected to each other by means of a curved intermediate section 13, wherein the sections 11,12,13 are in one piece.

Figure 3A:
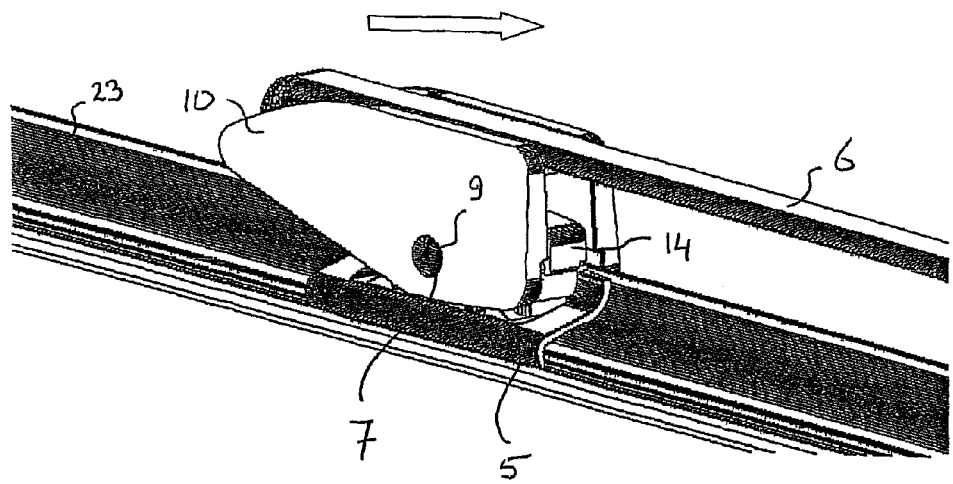
Figure 3B:
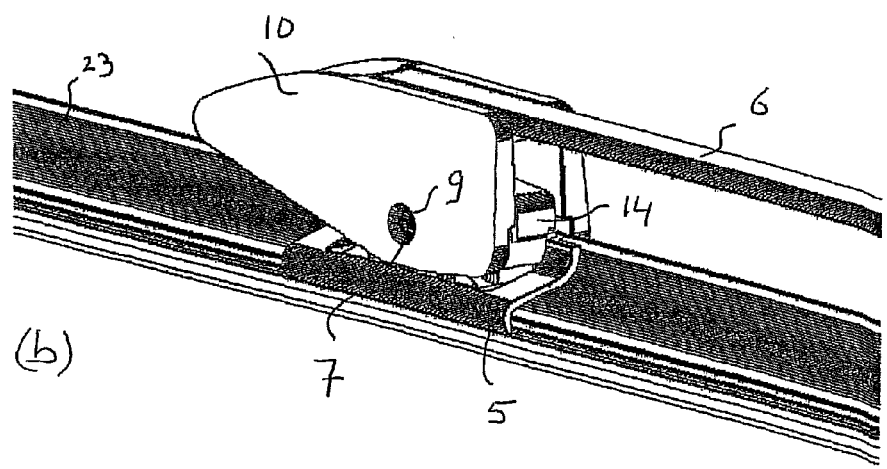
Figure 4B:
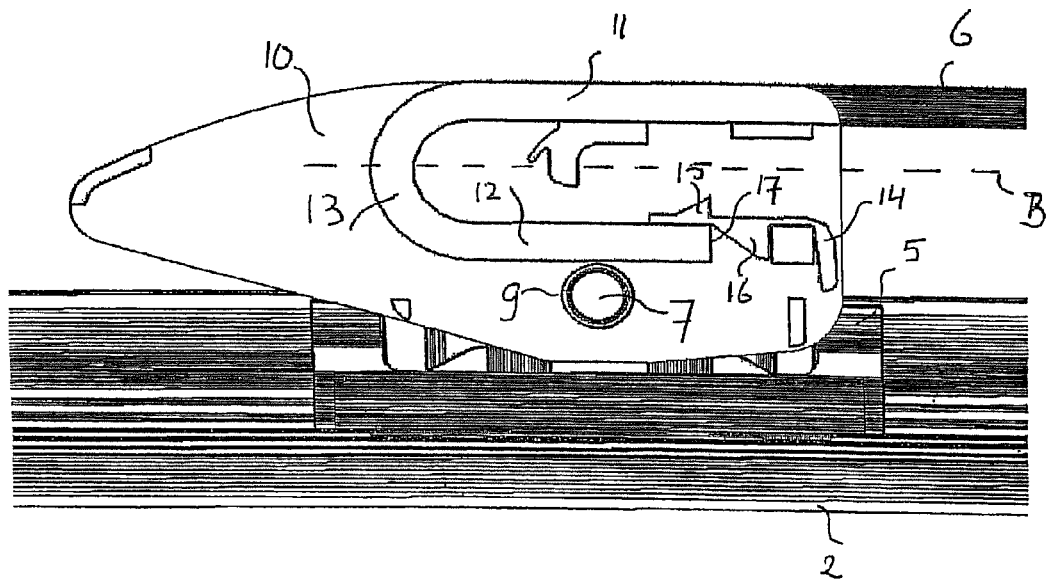

With reference to FIGS. 3A, 3B and 4A, 4B, the joint part 10 comprises one resilient tongue 14 comprising (in one piece therewith) an upwardly extending protrusion 15 and an downwardly extending protrusion 16. The upwardly extending protrusion 15 is adapted to engage in a correspondingly shaped hole 17 provided in an oscillating arm 6 of a first type (FIG. 4A), wherein the downwardly extending protrusion 16 is adapted to engage in a correspondingly shaped hole 17 provided in an oscillating arm 6 of a second type (FIG. 4B). As can be seen from FIGS. 4A, 4B, oscillating arms 6 of the first and the second types mutually differ in the distance between their respective parallel longitudinal arm sections 11, 12. The joint part 10 being already clipped onto the connecting device 5 can be easily slid on the hook-shaped end of the oscillating arm 6 (FIGS. 3A, 3B). During this sliding movement the resilient tongue 14 is initially pushed in against a spring force and then allowed to spring back into the hole 17, thus snapping, that is clipping the protrusion 15 or the protrusion 16 into the hole 17 (FIGS. 4A, 4B), dependent on the type of oscillating arm 6. The upwardly extending protrusion 15 and the downwardly extending protrusion 16 are provided with an inclined upper surface, so that sliding the longitudinal arm section 12 of the oscillating arm 6 of the first or the second type onto the joint part 10 will not take too much force. By subsequently pushing in again the protrusion 15 or the protrusion 16 against the spring force (as if it were a push button), the connecting device 5 and the joint part 10 together with the wiper blade 2 may be released from the oscillating arm 6. Dismounting the connecting device 5 with the wiper blade 2 from the oscillating arm 6 is thus realized by sliding the connecting device 5 and the joint part 10 together with the wiper blade 2 in a direction away from the oscillating arm 6. The joint part 10 is a true universal part for several types of oscillating arms 8, as will be clear from FIGS. 4A, 4B. As can be seen from FIGS. 4A, 4B, the mutually cooperating protrusions 7 and recesses 9 are located below (seen in cross-section) a longitudinal center plane B between the longitudinal arm sections 11,12 of the oscillating arm 6, even below the longitudinal arm section 12.

Figure 5A:
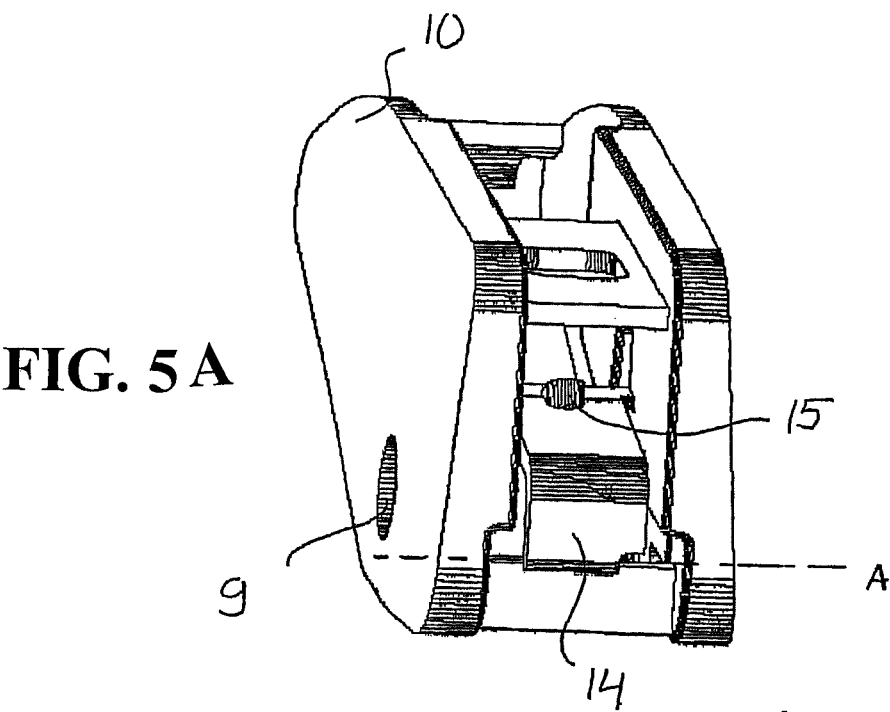
FIGS. 5A, 5B show different perspective, schematic views of the joint part of FIGS. 1A, 1B.
Figure 5B:
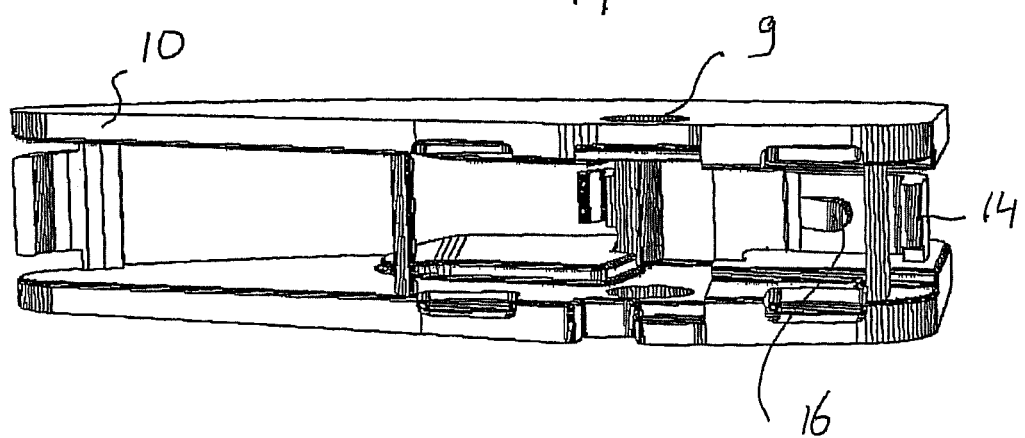

FIG. 5A, 5B show different perspective, schematic views of the joint part 10, wherein corresponding parts have been designated with the same reference numerals. The resilient tongue is hingeable around a hinge axis A.

Figure 6B:
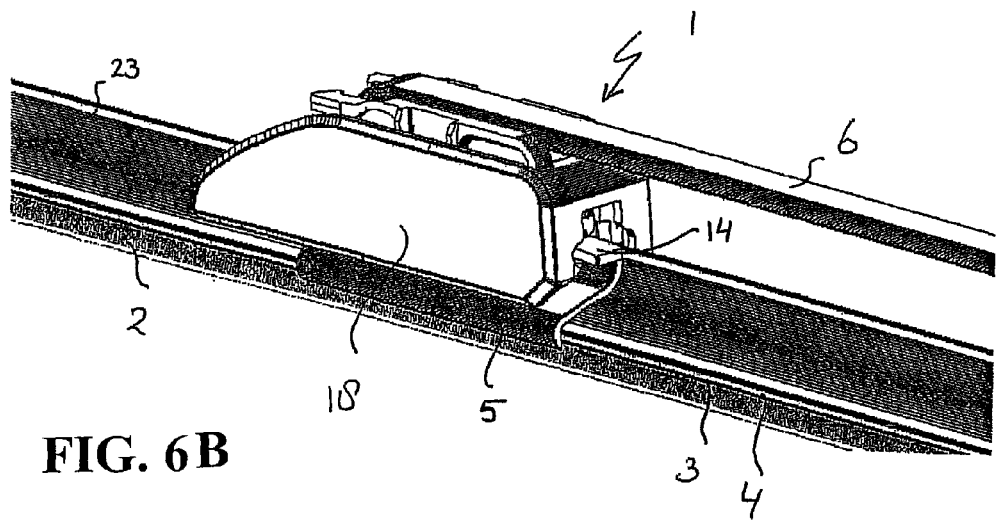
FIGS. 6A, 6B are perspective, schematic views of a windscreen wiper device of the "flat blade type" according to another preferred embodiment of the invention in exploded view 6A and in a side view 6B.
Figure 6A:
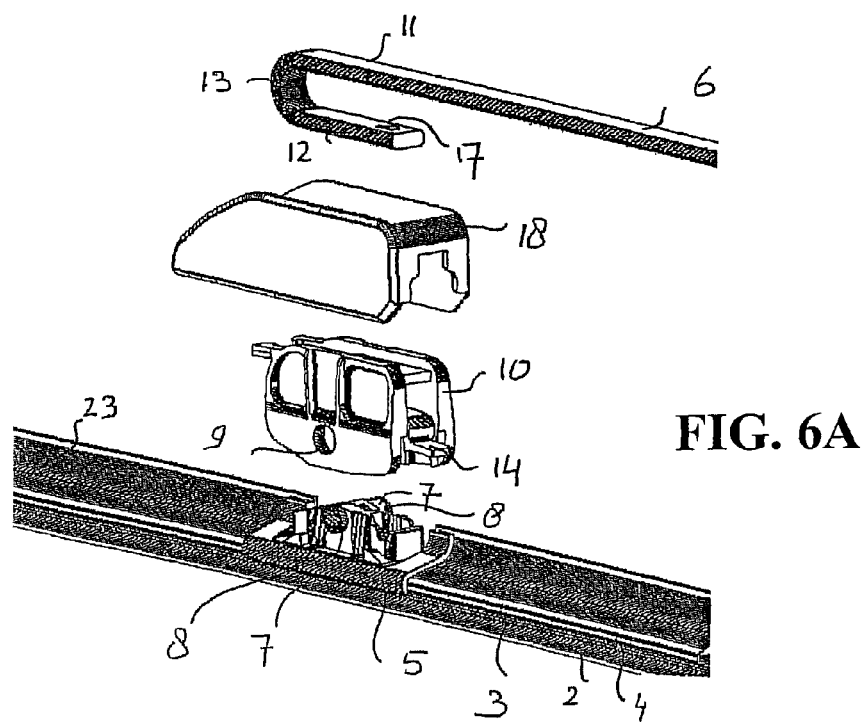
Figure 7A:
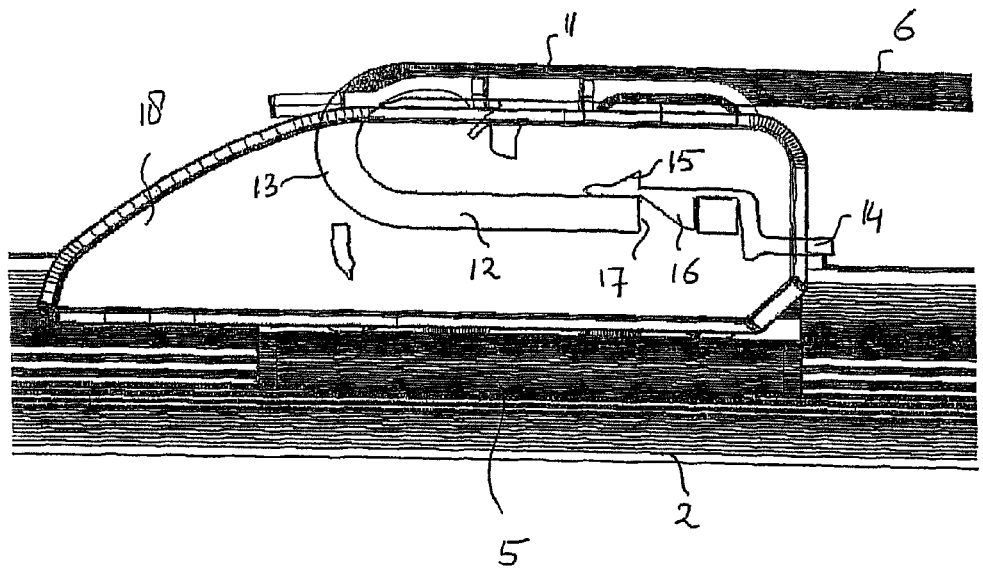
FIGS. 7A, 7B are cross-sections of FIG. 6B for two different types of oscillating arms.
Figure 7B:
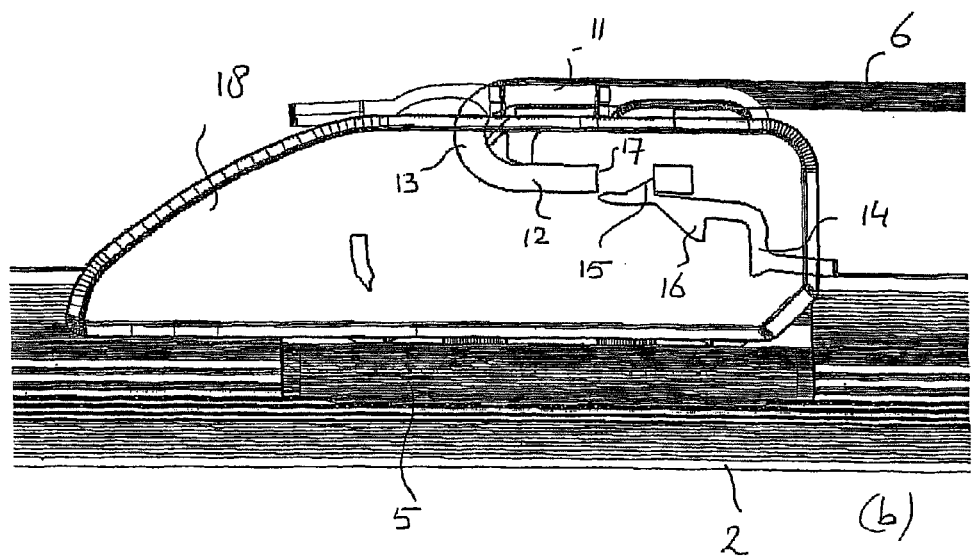
Figure 8A:
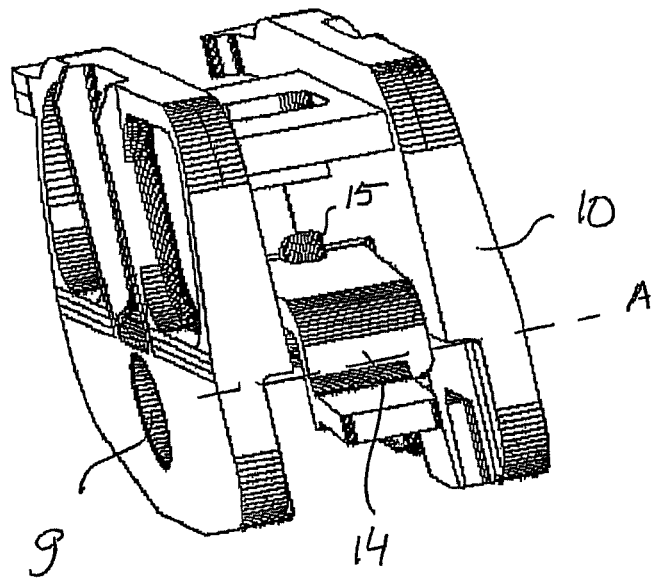
FIGS. 8A, 8B, 8C show different perspective, schematic views of the joint part and a cap of FIG. 6A.
Figure 8B:
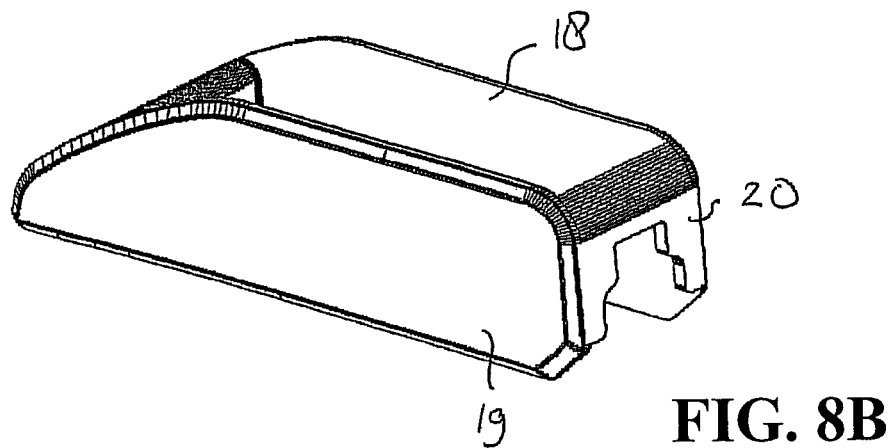
Figure 8C:
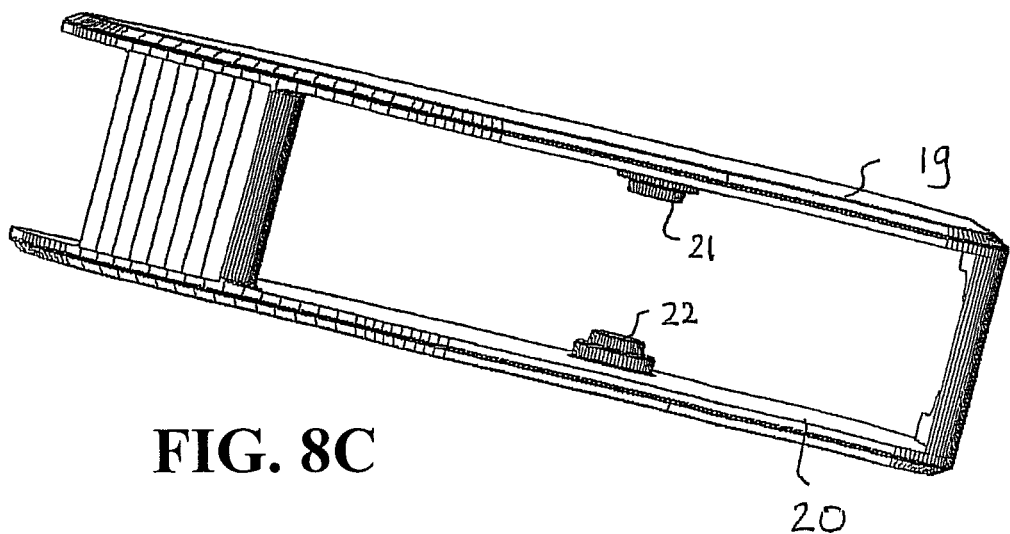

FIGS. 6, 7 and 8 correspond to FIGS. 1, 4 and 5, but now relating to a different type of joint part 10 and to the use of a cap 18, wherein corresponding parts have been designated with the same reference numerals. A connecting device 5 as shown in FIGS. 6, 7 and 8 is identical to the same of FIGS. 1A and 1B, so that the connecting device 5 is a true universal part for several types of oscillating arms 8. As can be seen from FIGS. 6, 7 and 8, now a cap 18 is provided functioning as extra retention means for retaining the wiper blade 2 onto the oscillating arm 6 of the first type or the second type (FIGS. 7A, 7B). The cap 18 is detachably connected to the joint part 10 and the connecting device 5 through a snap connection, while cap 18 is provided with two walls 19, 20 each comprising an inwardly extending protrusion 21, 22. The protrusions 21, 22 pivotally engage into the recesses 9 of the joint part 10 and into the holes 8 of the protrusions 7 of the connecting device 5. The recesses 9 and the holes 8 are co-axial with the protrusions 21, 22. Possibly, a spoiler 23 is furthermore present being made in one piece with the wiper blade 2.

Figure 9A:
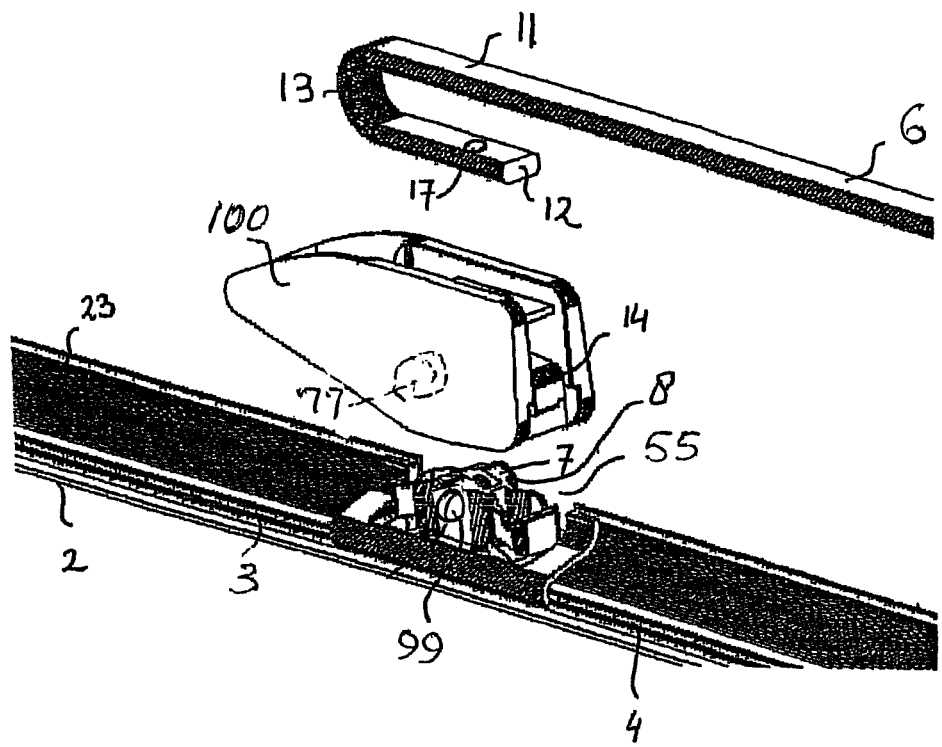
FIGS. 9A, 9B show an alternate embodiment of the invention.
Figure 9B:
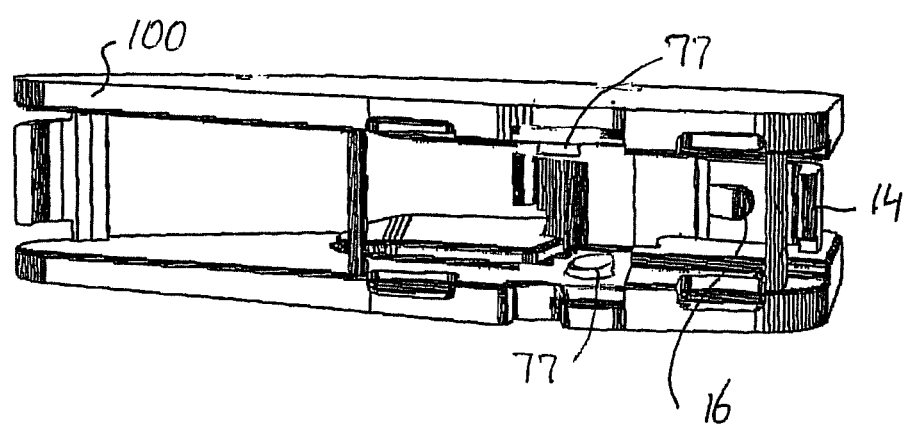

FIGS. 9A, 9B depict an alternate embodiment of the invention in which protrusions 77 are located on the joint part 100 and recesses 99 are located on the connecting device 55.

The invention is not restricted to the variants shown in the drawing, but it also extends to other embodiments that fall within the scope of the appended claims.

What is claimed is:

1. A windscreen wiper device, comprising: a longitudinally extending wiper blade;
a carrier of spring steel material supporting and self-biasing said wiper blade toward a curved shape;
a connecting device anchored to said carrier and projecting upwardly therefrom away from said wiper blade;
a shaped spoiler arranged above said carrier and extending from said connecting device from opposite sides thereof;
a joint part detachably connected by a snapping or clipping action to said connecting device in such manner as to establish a pivot joint connection between said joint part and said connecting device so that said joint part pivots relative to said connecting device; said joint part including a resilient tongue; said resilient tongue including at least one upwardly extending latching protrusion and at least one downwardly extending latching protrusion for selective engagement with a hole of a hook-shaped wiper arm when slid into coupling engagement with said resilient tongue; said upwardly extending latching protrusion and said downwardly extending latching protrusion being provided with inclined surfaces; and
a cap member detachably connected by a snap connection to said joint part, said cap member having a U-shape with a top portion and two sidewall portions, said top portion positioned on top of said joint part and said two sidewall portions being positioned on each outer side surface of said joint part so as to substantially cover said outer side surfaces.

2. The windscreen wiper device as described in claim 1 further comprising inwardly extending protrusions on said sidewall portions for engagement with corresponding openings in said joint part.

* * * * *